(12) United States Patent
Okada et al.

(10) Patent No.: US 8,040,344 B2
(45) Date of Patent: Oct. 18, 2011

(54) CAD SYSTEM, CONTROL METHOD AND CONTROL PROGRAM FOR SAME

(75) Inventors: Yuuki Okada, Kawasaki (JP); Osamu Furukawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 837 days.

(21) Appl. No.: 12/062,258

(22) Filed: Apr. 3, 2008

(65) Prior Publication Data

US 2008/0255810 A1 Oct. 16, 2008

(30) Foreign Application Priority Data

Apr. 5, 2007 (JP) ................................. 2007-099355

(51) Int. Cl.
*G06T 15/00* (2011.01)
(52) U.S. Cl. .......... 345/419; 345/441; 345/581; 700/83; 700/95; 703/6; 703/9; 703/22
(58) Field of Classification Search .................. 345/419, 345/441, 581; 700/83, 95; 703/6, 9, 22
See application file for complete search history.

(56) References Cited

U.S. PATENT DOCUMENTS

| | | | | |
|---|---|---|---|---|
| 5,299,297 A | * | 3/1994 | Reynolds et al. | 345/421 |
| 5,740,341 A | * | 4/1998 | Oota et al. | 345/420 |
| 5,777,896 A | * | 7/1998 | Arita et al. | 702/185 |
| 6,041,171 A | * | 3/2000 | Blaisdell et al. | 703/6 |
| 6,681,140 B1 | * | 1/2004 | Heil | 700/95 |
| 6,704,696 B1 | * | 3/2004 | Kuramochi et al. | 703/9 |
| 6,965,855 B1 | * | 11/2005 | Burbridge et al. | 703/22 |
| 7,729,789 B2 | * | 6/2010 | Blevins et al. | 700/83 |
| 7,859,544 B2 | * | 12/2010 | Okada | 345/581 |
| 2006/0279572 A1 | | 12/2006 | Okada et al. | |

FOREIGN PATENT DOCUMENTS

| | | |
|---|---|---|
| JP | 06-309418 A | 11/1994 |
| JP | 2000-293567 A | 10/2000 |
| JP | 2006-344095 A | 12/2006 |

* cited by examiner

*Primary Examiner* — Phu Nguyen
(74) *Attorney, Agent, or Firm* — Foley & Lardner LLP

(57) ABSTRACT

The present invention reduces the number of diagrams and the workload of management and the like, by aggregating spools of a common format, in plant design technology using a three-dimensional CAD system. Format specific data which is stored separately according to spool format is obtained by aggregating the respective spools in the internal data, which is generated by a data acquisition means, into respective common formats by a spool aggregation means. In this process, a comparison and classification means compares the contents of the control point tables relating to the respective spools, between each and every pair of the spools, so as to confirm whether there exist control point tables which are the same, with taking all of the start points of each spool as a point of origin, thereby determines whether both spools of each pair are matching based on prescribed common characteristics, as the result of this determination, in cases where both spools are matching, then creates format specific data which is stored separately with respect to each spool format.

10 Claims, 9 Drawing Sheets

- 402 CONTROL POINT 2 (INTERSECTION POINT OF JUNCTION)
- 405 CONTROL POINT 5 (SHOP WELD POINT)
- 404 CONTROL POINT 4 (BENDING POINT)
- 401 CONTROL POINT 1 (SHOP WELD POINT)
- 406 CONTROL POINT 6 (JUNCTION POINT)
- 403 CONTROL POINT 3 (SHOP WELD POINT)

(a)

(b)

| START POINT | END POINT | COMPONENT | NOMINAL PIPING SIZE (mm) | LENGTH (mm) | BEND RADIUS (mm) | VECTOR |
|---|---|---|---|---|---|---|
| 401 | 402 | STRAIGHT PIPE | 100 | 800 | --- | (1, 0, 0) |
| 402 | 403 | STRAIGHT PIPE | 100 | 600 | --- | (1, 0, 0) |
| 403 | 404 | ELBOW | 100 | 200 | --- | (1, 0, 0) |
| 404 | 405 | ELBOW | 100 | 400 | 150 | (0, 1, 0) |
| 402 | 406 | WELD SEAT | 25 | 100 | --- | (0, 0, 1) |

(a) PARAMETER DIAGRAM

| NOMINAL PIPING SIZE | DN100 |
|---|---|
| WALL THICKNESS | Sch. 40 |
| MATERIAL | A106Gr.B |
| DESIGN PRESSURE | 0.35MPa[g] |
| DESIGN TEMPERATURE | 200°C |

(b) PARAMETER LIST

| No. | SPOOL | WELD NUMBER 1 | WELD NUMBER 2 | LENGTH (mm) |
|---|---|---|---|---|
| 1 | A00-1-3 | W01 | W02 | 1000 |
| 2 | A00-1-5 | W11 | W12 | 1000 |
| 3 | A00-1-6 | W21 | W22 | 1500 |
| 4 | A00-5-1 | W51 | W52 | 2000 |
| 5 | B12-3-1 | W91 | W92 | 3500 |

(a) PARAMETER DIAGRAM

| NOMINAL PIPING SIZE | DN100 |
|---|---|
| WALL THICKNESS | Sch. 40 |
| MATERIAL | A106Gr.B |
| DESIGN PRESSURE | 0.35MPa[g] |
| DESIGN TEMPERATURE | 200°C |

(b) PARAMETER LIST

| No. | SPOOL | WELD NUMBER 1 | WELD NUMBER 2 | WELD NUMBER 3 | LENGTH (mm) |
|---|---|---|---|---|---|
| 1 | A00-1-4 | W05 | W05 | W05 | 1000 |
| 2 | A00-2-1 | W15 | W15 | W15 | 1000 |
| 3 | A00-2-4 | W25 | W25 | W25 | 1500 |
| 4 | A01-5-1 | W55 | W55 | W55 | 2000 |
| 5 | C12-3-1 | W95 | W95 | W95 | 3500 |

CAD SYSTEM, CONTROL METHOD AND CONTROL PROGRAM FOR SAME

BACKGROUND OF THE INVENTION

1. Field of the Invention

The present invention relates to a CAD system.

2. Description of the Related Art

The design of thermal, nuclear or hydroelectric power plants involves planning the layout of the various piping systems used in the respective plants. In recent years, CAD systems capable of three-dimensional layout adjustment have been used for this layout planning work, due to the good usability that they offer, from the data input step to the development and management of the layout at subsequent steps in the design procedure of the plant. A three-dimensional layout adjustment CAD system, and the related software, are known as "tools".

In work relating to layout planning, the piping designer, using a three-dimensional layout adjustment CAD, arranges pipe components in a three-dimensional virtual space to create piping routes, resulting in creating layout data for the pipe components. Furthermore, a database of pipe specifications data is created using attribute information of piping system to be designed in the form of a spreadsheet, or the like.

In this layout data and specification database, numbers of the piping system are essential as keys, and information relating to the components, such as detailed system name, maximum operating pressure and temperature of the piping system, pipe wall thickness, material, grooves for butt welding, and the like, is written to the database. An operation of this kind is carried out in respect of all of the pipe relating to the plant, thereby building up layout data and a specifications database of the three-dimensional layout adjustment CAD.

More specifically, when using recent tools, isometric diagrams are output automatically on the basis of the layout data of the three-dimensional layout adjustment CAD. These diagrams are simple and straightforward, and therefore only contain the minimum necessary level of information relating to installation, however, provided that this information is output, then it is possible to carry out an installation arrangement which is at least problem-free.

A further concern in regard to installation are the "pipe spools". A "spool" is the smallest installation unit handled at the installation site, and it signifies a unit which is manufactured in a factory before being transported to the installation site. The spools are set to a size which is suitable for manufacture in a factory, transportation from the factory to the site, and installation at the site. Pipe spools of this kind are manufactured in the factory by welding together straight pipe sections, joints, flanges, and weldolets, and these welds are called "shop welds".

On the other hand, the welding together of respective pipe spools at the installation site is called a "site weld". With respect to shop welds and site welds, in general, machining and welding is easier to carry out in a factory since appropriate processing equipment can be installed, and therefore priority is given to increasing the number of shop welds. However, if consideration is given to the convenience of processing at the installation site, then there are cases where pipe spools having a simple format are easier to handle. For example, spools formed by simply welding a joint to a straight pipe section using a shop weld may cause an increase in the number of on-site welds required, but they are not liable to create problems due to manufacturing nonconformities in the factory.

Conventionally, in plant design using three-dimensional CAD, technology for defining pipe spools such as those described above has been proposed (see, for example, Japanese Patent Application Publication No. 2000-293567).

However, in the conventional technology described above, all of the isometric diagrams are output from a tool in relation to a plurality of spools of the same format, and therefore the number of diagrams handled in one project becomes very large, and hence the management work increases, resulting in a very large task load.

In other words, if there are a plurality of spools of the same format for a particular plant, then in the conventional technology, all of the isometric diagrams for each of the spools are output from a tool, respectively and separately. As a result, diagrams are produced in the form of one sheet per component, even in the case of spools of the same format, or spools which are only a little different in terms of their dimensions. Consider, for instance, a case of spools having a simple format, where the number of different spools is very large, but the differences between the respective diagrams for each spool only relate to differences in the length of the straight pipe sections. Since these spools cannot be handled collectively, then it is necessary to manage a large volume of diagrams with recognizing those respective differences.

Furthermore, during the design procedure, if the piping layout is changed, then the spool diagrams must also be revised, but carrying out revision work for a huge number of diagrams which have been prepared individually as described above merely serves to make the amount of revision work involved much greater still. Consequently, the number of diagrams handled in one project becomes enormous, and the management work therefore increases, leading to a very large task load.

The present invention was devised in order to resolve the prior art problems such as those described above, an object thereof being to reduce the number of diagrams and the workload relating to their management, and the like, by aggregating spools of a common format, in technology relating to plant design using a three-dimensional CAD.

SUMMARY OF THE INVENTION

In order to achieve the object described above, one mode of the present invention is a CAD system which is realized through a processing unit of a computer, comprising: a three-dimensional layout adjustment CAD means for assisting the creation of a three-dimensional model of a pipe which constitutes a design object, and for providing pipe layout data including spool numbers; a storage means for storing previously prepared pipe specifications data; a data acquisition means for reading in the layout data and the specifications data, and for associating the layout data and the specifications data through linking keys to set the obtained data as internal data; and a spool aggregating means for aggregating the respective spools in the internal data into respective common formats to obtain format specific data. A method and a program are also proposed on this basis.

According to the present invention, by aggregating spools which are acquired as internal data, and by sharing format diagrams for spools of a common format covering a little difference in dimensions, it is possible to reduce the number of diagrams and the management workload, and the like, and therefore design and manufacture of higher quality can be achieved readily.

DETAILED DESCRIPTION OF THE PREFERRED EMBODIMENTS

Below, preferred embodiments for putting the present invention into practice are described with reference to the diagrams. Premises which are common with the description of the background technology and problems given above will be omitted from the following explanation, as appropriate.

1. Composition

Figure 1:
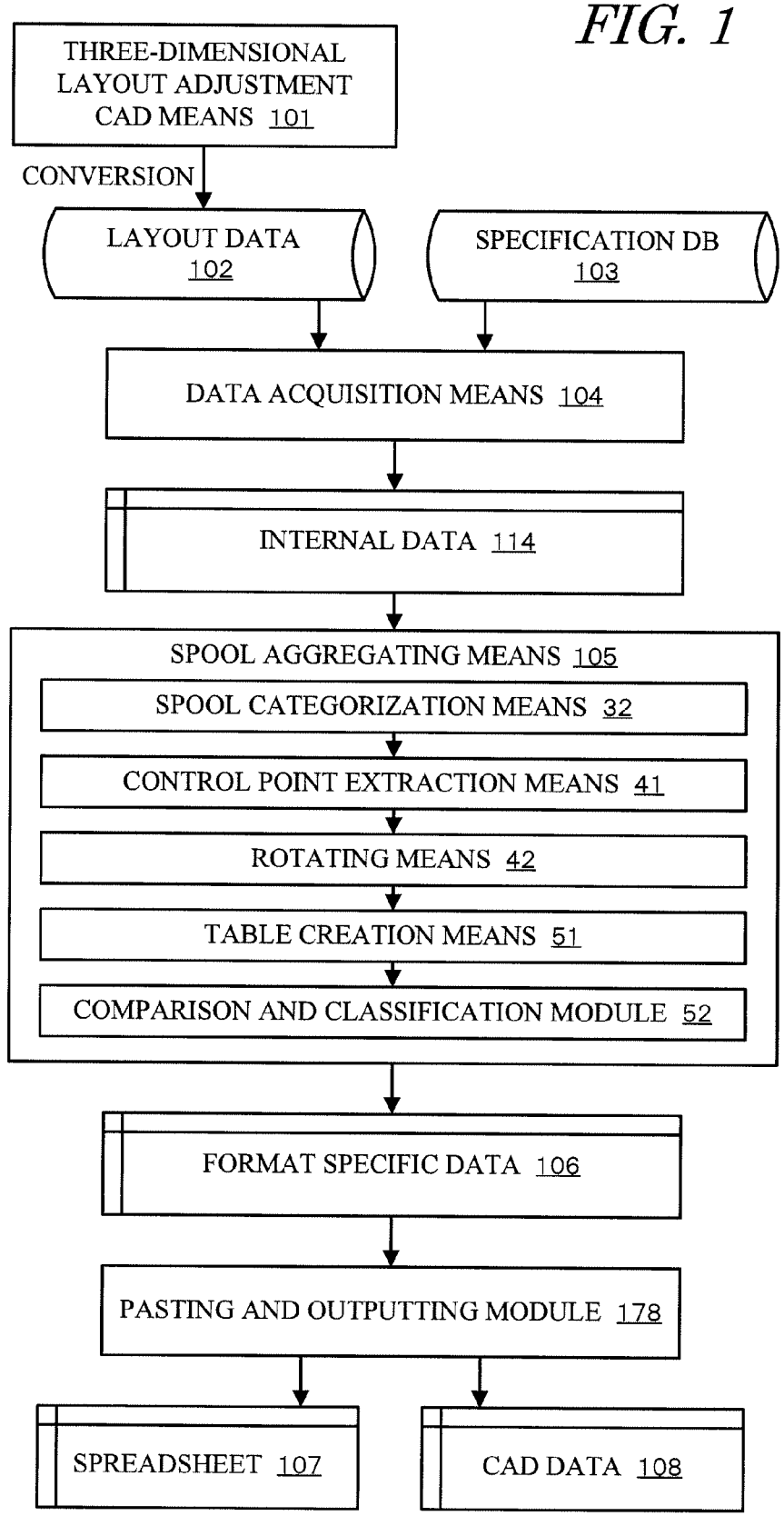
FIG. 1 is a diagram showing the composition of an embodiment of the present invention.

Firstly, the composition of a CAD system according to the present embodiment (hereinafter, called "the present system" as appropriate) is shown in FIG. 1, and the elements of the respective means shown in FIG. 1 are realized by controlling the central processing unit (CPU) of a computer, such as a PC (personal computer), through a prescribed control program.

In this system, the three-dimensional layout adjustment CAD means 101 is a unit which assists in the creation of a three-dimensional model of piping that constitutes the design object, and which provides layout data. Layout data 102 of a three-dimensional layout adjustment CAD is obtained by converting the output data from this CAD means 101, or internally converting the data to be output from the CAD means 101, and the layout data 102 may be provided in the form of a spreadsheet, text or a database. Input of spool numbers are completed through the CAD means 101, or alternatively, after conversion to layout data 102.

Furthermore, the layout specification database (DB) 103 is a means for storing pipe specification data, which has been prepared in advance, and this specification DB 103 may be provided in the form of a spreadsheet, text, or a database.

Linking values are recorded as attributes, respectively, in a link field of any given record in the table of the specification DB 103, and in a link field of any given record in the table of the layout data 102 of the three-dimensional layout adjustment CAD.

Therefore, if the same value is recorded in the link fields of the records in both tables, then a relation is created between the database tables, and the tables can be handled as one table.

The present system also includes (FIG. 1) a data acquisition means 104 for acquiring spool data, a spool aggregating means 105 for aggregating spools respectively into common formats to obtain format specific data 106, and a pasting and outputting means 178 for outputting the format specific data 106 for the aggregated spools.

Furthermore, the spool aggregating means 105 has a spool categorization means 32 for categorizing the spools into number units, a control point extraction means 41 for extracting the shop weld points, bending points and junction points, as control points, a rotating means 42 for rotating the spools to set them to a common arrangement and orientation, a table creating means 51 for creating tables of control points as internal data, and a comparison and classification means 52 for comparing the tables of control points and storing format specific data 106, respectively and separately for each spool format.

These elements shown in FIG. 1 are processing means for realizing and executing the respective functions and actions described below of the present invention and the present embodiment.

2. Action

In the present embodiment described above, the processing described below is started and executed automatically when a prescribed processing start button operation, or the like, is received from the user. Desirably, a screen is prepared on which the filenames of the layout data 102 and the specification DB 103 can be selected, or where the range of the text strings of the spools to be subjected to processing can be selected.

2.-1. Acquisition of Data

Firstly, the data acquisition means 104 opens the files of the layout data 102 and the specifications DB 103, reads in the data, and associates the read data through a common linking key, in other words, a unique key, to set the obtained data as internal data 114 (data acquisition processing). Through this data acquisition processing, the design information which is lacking in the layout data 102 is complemented, and all of the components recorded in the layout data 102, and their attributes, are registered in the present system as internal data under processing by the program.

2-2. Aggregation of Common Spools

The respective spools in the internal data 114 generated in this way by the data acquisition means 104 are aggregated by the spool aggregating means 105 into respective common formats, thereby obtaining format specific data 106 which is stored for each respective spool format (spool aggregation processing).

Figure 2:
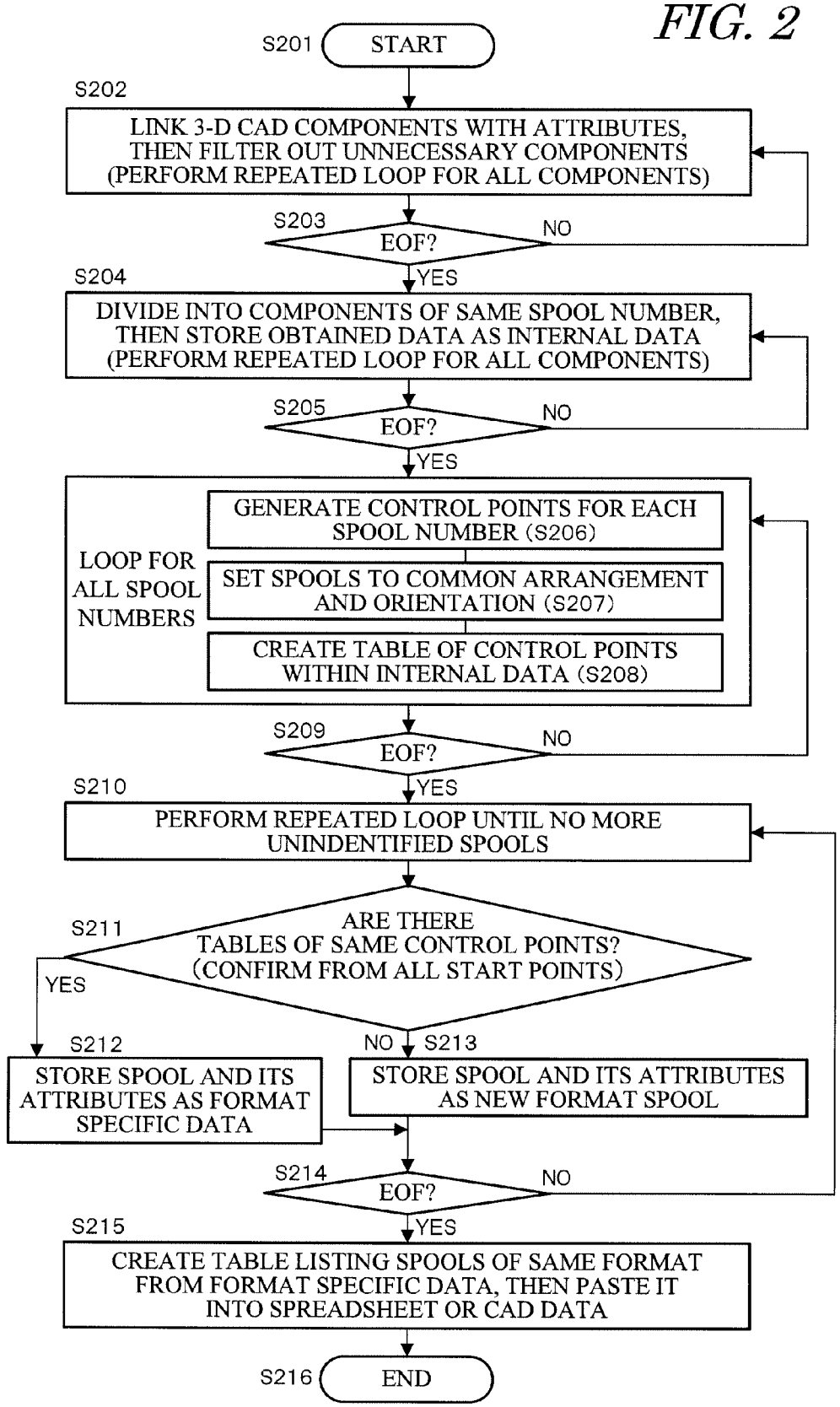
FIG. 2 is a flowchart showing the processing sequence according to an embodiment of the present invention.

The flowchart in FIG. 2 shows the procedure of spool aggregation processing which categorizes the spools into respective formats in this way. In this procedure, firstly, the spool categorization means 32 categorizes the internal data 114 into spool number units.

More specifically, in addition to linking the three-dimensional model data relating to the layout data 102 with the specifications database 103, in other words, the attributes database, the spool categorization means 32 repeats processing for filtering out prescribed components which are not necessary for processing (step 202), in respect of all of the components which constitute the design object, in other words, all of the data (step 203).

Furthermore, by performing a (repeated) loop in respect of all of the components, in other words, all of the remaining data of the internal data 114 after filtering, the spool categorization means 32 carries out processing for dividing the components respectively into components having the same spool number, in other words, aggregating the data into spool number units to store the obtained data as the internal data 114 again (step 204), until this processing has been completed for all of the data (step 205).

Subsequently, the control point extraction means 41 extracts the shop weld points, bending points, and junction points included in each spool, as control points representing the format of the spool, for each of the spool numbers, (step 206), and the rotating means 42 rotates the respective spools within the prescribed three-dimensional coordinates space on the basis of these control points, thereby setting the spools to a common arrangement and orientation (step 207), whereupon the table creating means 51 creates a table of control points within the internal data 114 (step 208). These processes are carried out through a (repeated) loop for all of the spool numbers, in other words, all of the data, until completed in respect of all of the data (step 209).

Moreover, the comparison and classification means 52 compares the contents of the control point tables relating to the respective spools, between each and every pair of the spools, so as to confirm whether there exist control point tables which are the same, with taking all of the start points of each spool as a point of origin (step 211), thereby determines whether both spools of each pair are matching based on prescribed common characteristics, as the result of this determination, in cases where both spools are matching, then creates format specific data which is stored separately with respect to each spool format.

In other words, data which is matching in terms of having the same table of control points is stored as format specific data 106 which is classified respectively for each spool format, in such a manner that spools of the same format are aggregated, and in this process, the attribute information required for the table creation processing described below is also stored in association with the formation specific data 106 (step 212).

When each spool is checked comprehensively against all of the others in this fashion, if a spool of the same format is not discovered, then the spool and its attributes are stored in the format specific data 106 as a new format (step 213). The processing described above is repeated in a loop for all of the data (step 214), until there are no more unidentified spools (step 210).

2-3. Output of Data

The pasting and outputting means 178 takes the format specific data 106 obtained as described above and creates a table listing the spools of the same format, for instance, which is output in the form of a file in which the table is pasted into a spreadsheet 107 or CAD data 108 (step 215), thereby improving working efficiency. When the series of processes described above has been completed, the procedure transfers to the next process or screen depending on the settings, for example, it returns prompt to a user.

3. Embodiments

The present embodiment which has been described above can be used in various different applications relating to layout editing, but here, a concrete example is described in relation to a case where it is applied to machinery, process pipes and cables in a power generating plant. The following description will center in particular on the spool aggregation processing carried out by the spool aggregation means 105.

3-1. Specific Contents

Figure 3:
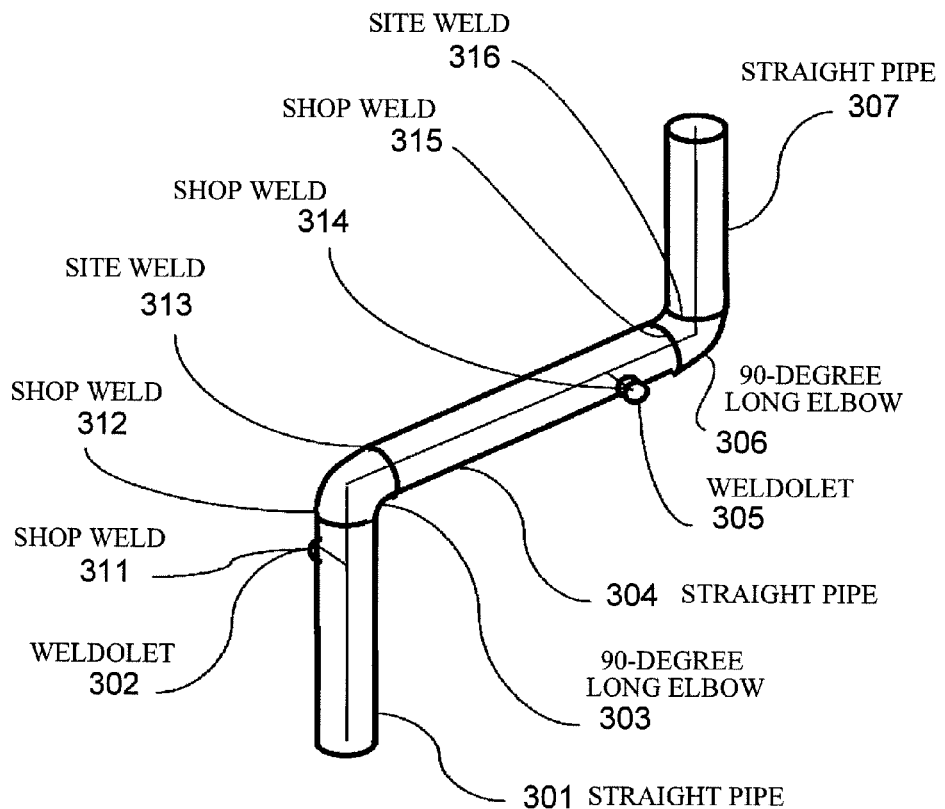
FIG. 3 is a conceptual diagram showing one portion of processing pipes for a power generating plant, which serves as an illustrative sample in the embodiment of the present invention.

Firstly, FIG. 3 shows a portion of a three-dimensional model of the process pipes for a power generating plant, which is extracted as an illustrative sample. This sample is formed by welding together, as respective components, the straight pipes 301, 304, 307, the 90-degree long elbow sections 303, 306 and the weldolets 302 and 305. Numerals 311, 312, 314 and 315 denote shop welds, and numeral 313 and 316 denote site welds.

Figure 4:
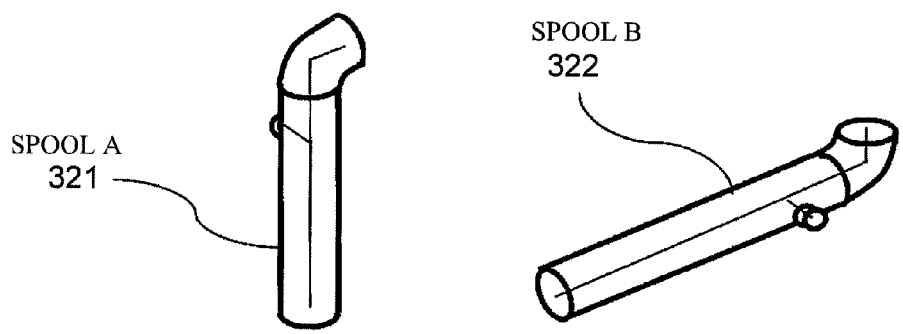
FIG. 4 is a conceptual diagram showing identification information relating to spools according to an embodiment of the present invention.

In the sample shown in FIG. 3, the straight pipe 301, the weldolet 302 and the elbow 303 are assigned with the spool number (identification information) of "spool A" (321), as shown in FIG. 4, and the straight pipe 304, the weldolet 305 and the elbow 306 in the sample shown in FIG. 3 are assigned with the spool number (identification information) of "spool B" (322). Furthermore, for descriptive purposes, the straight pipe 307 is taken to be included in a different spool to spools A and B described above. An example where the spools A (321) and B (322) are aggregated into a spool of the same format will be described below.

Here, the sample in FIG. 3 shows three-dimensional CAD data which has been created by a CAD means 101 (FIG. 1), and while the data may be in any format at this stage, it is converted into layout data 102 by the CAD means 101 when used. This layout data 102 includes information relating to the component name, the spool name, the welding information, and the coordinates of the respective points; design information, such as the respective attributes which are not included in this layout data 102, are stored in the specifications DB 103, and examples of this information are the pipe wall thickness, the material, the fluid to be carried inside the pipe, the design pressure, the design temperature, and so on.

3-2. Categorization of Spools

The spool categorization means 32 carries out processing for categorizing the whole of the sample such as that shown in FIG. 3 into different spool numbers as shown in FIG. 4, and in this processing, the respective spool numbers are filtered and the components are categorized into groups of components having the same spool number, for instance, by working sequentially in ascending order from the smallest spool number and excluding all elements having a different spool number as components which are not required for processing. Although each individual spool can be broken down on the basis of the site welds, the categorization process should be carried out on the basis of the matching spool numbers. By categorizing the spools in this fashion, for example, spool A (321) and spool B (322) in FIG. 4 are identified as being mutually different and separate spools and are stored as internal data 114 prior to the spool aggregation processing.

Figure 5:
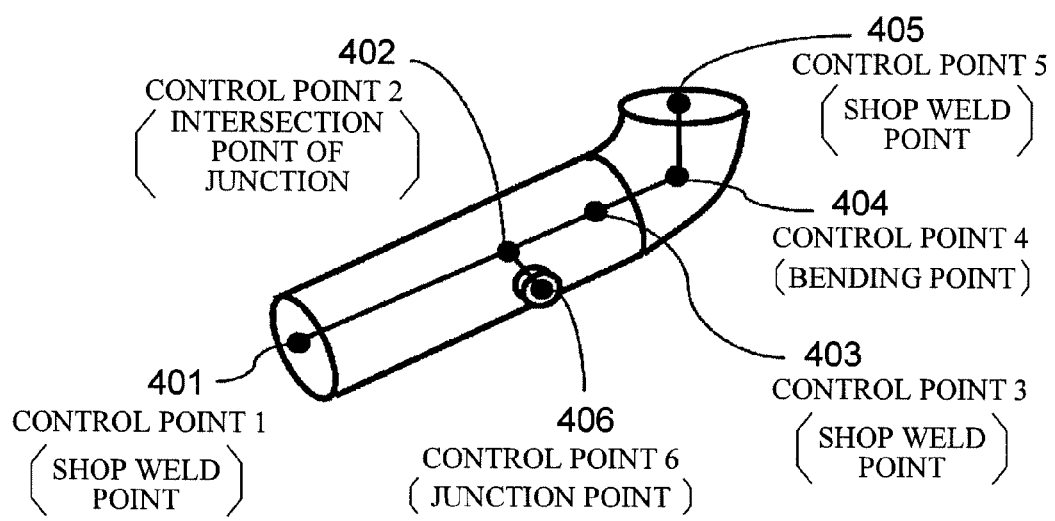
FIG. 5 is a conceptual diagram showing a mode of generating control points from a spool, in an embodiment of the present invention.

Next, the control points which represent the characteristic features of the format of each of the individual spools are generated by the control point extraction means 41, on the basis of rules whereby the shop weld points, the bending points and the junction points are taken as control points. Here, FIG. 5 shows a conceptual diagram of a state where control points are generated from a spool. For example, control point 1 (401) is set as a control point because it matches the condition of being a shop weld point, and the other control points are set respectively in a similar fashion, namely, control point 2 (402), because it is an intersection point of a junction, control point 3 (403), because it is a shop weld point, control point 4 (404), because it is a bending point, control point 5 (405), because it is a shop weld point, and control point 6 (406), because it is a junction point.

Figure 6:
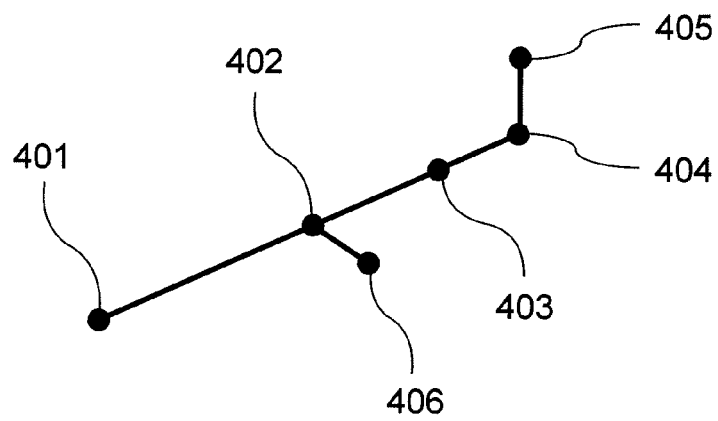
FIG. 6 is a conceptual diagram showing a state where the shape, orientation, or other characteristics, of each spool are identified and processed on the basis of the control points alone, in an embodiment of the present invention.

Thereafter, in the internal data and the respective processes based on same, these control points alone are sufficient to identify and process the format of each spool, such as the shape and orientation of the spool, as shown in FIG. 6.

3-3. Unification of Arrangement and Orientation

The respective spools for which the control points have been extracted as described above are arranged directly at various positional coordinates in the three-dimensional coordinates space, and since their orientation is not unified, than it is difficult to compare their common properties. Therefore, the comparison is made easier by setting the spools to a unified arrangement and orientation. Here, FIG. 7 is a conceptual diagram showing processing for unifying the arrangement and the orientation of the respective spools.

Figure 7:
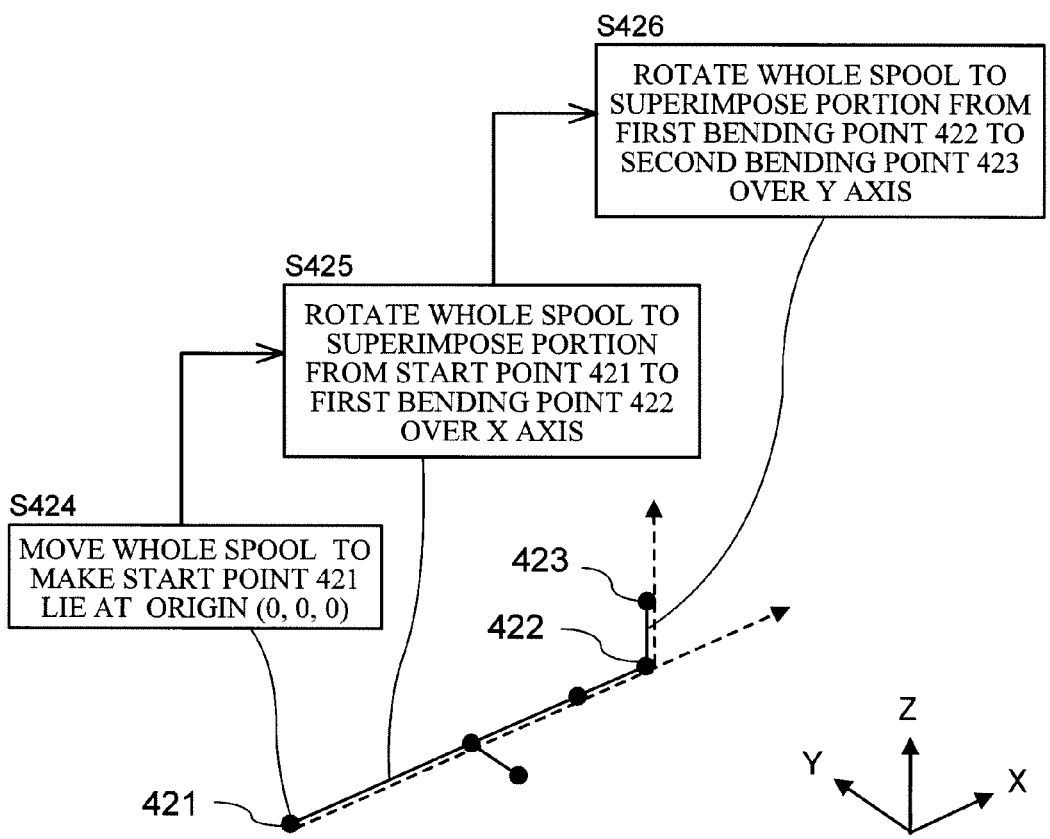
FIG. 7 is a conceptual diagram showing processing for setting the respective spools to a common arrangement and orientation, in an embodiment of the present invention.

More specifically, as shown in FIG. 7, firstly, the whole spool is moved in such a manner that the start point 421 lies at the point of origin (0, 0, 0) in the prescribed three-dimensional coordinates space (step 424). Thereupon, the whole spool is rotated in such a manner that the portion from the start point 421 to the first bending point 422 is superimposed over the X axis in the aforementioned space (step 425). Finally, the whole spool is rotated in such a manner that the portion from the first bending point 422 until the second bending point 423 is superimposed over the Y axis in the space (step 426). By carrying out this processing sequentially for each of the spool numbers, all of the spools can be set to the same arrangement position and orientation in a common X-Y plane, and therefore the subsequent processing can be simplified.

3-4. Creation of Control Point Table

Figure 8:
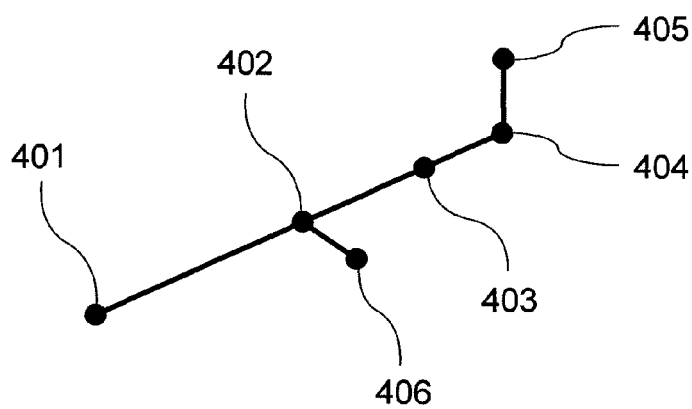
FIG. 8 is a conceptual diagram showing an example of control points, and a table of control points created on the basis of these control points, according to an embodiment of the present invention.

Furthermore, FIG. 8 is a conceptual diagram showing processing for creating a table of control points (FIG. 8(2)) by evaluating characteristics by calculating values, such as the distance, between the respective control points, on the basis of the respective control points (FIG. 8(1)) shown in FIG. 6.

In this process, for each spool, a table of information including the start point at either one of the ends of the spool, and all of the mutually adjacent control points, is saved. Furthermore, tables starting from all of the respective start points are created and saved for each respective spool.

In these tables, taking each control point as a start point and taking the subsequent control point as an end point, the name of the component and the nominal piping size between each pair of points is stated as an information element which expresses the format of the spool. This information is acquired by extraction, or calculated, from the layout data 102 and the specifications DB 103. In this case, since the coordinates of the control points are already known, then it is possible to calculate the length, the bend radius and the vectors, and furthermore, although it is desirable that attributes such as the pipe wall thickness, material, carried fluid, design pressure and temperature, and the like, should be added to the information elements in the table, for the purposes of comparison and contrast, this is not essential.

3-5. Comparison and Classification Processing

Figure 9:
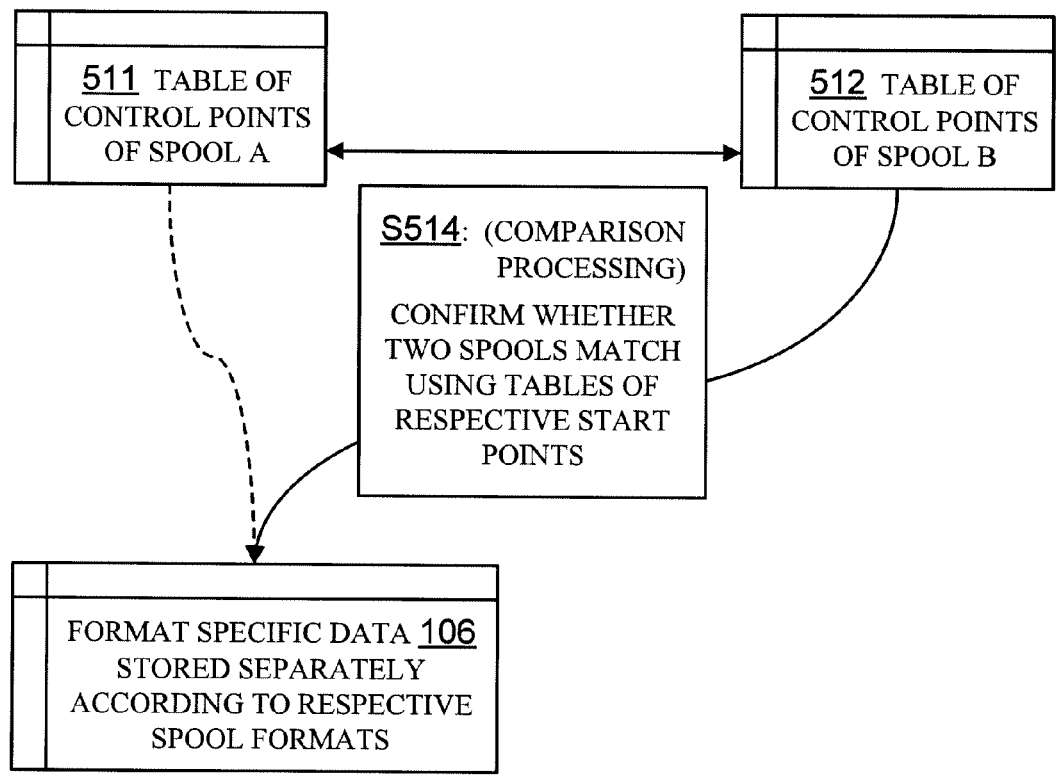
FIG. 9 is a conceptual diagram showing processing for comparing tables of control points and storing internal data separately for respective spool formats, in an embodiment of the present invention.

Furthermore, FIG. 9 is a conceptual diagram of processing for comparing the tables of control points created as described above and storing format specific data 106 for each respective spool format. In this processing, all of the spools are checked progressively, but here, for instance, it is supposed that spool A has already been stored as internal data, at a certain point in time. In other words, the table 511 of the control points of spool A is contained in the format specific data 106 which is stored separately according to the respective spool formats.

Here, when carrying out processing with respect to spool B, the table 512 of the control points of spool B is compared with the table 511 of control points of spool A in the format specific data 106 (step S514). This comparison process involves comparing the respective tables from the various start points of each spool, and if a match can be confirmed on the basis of prescribed reference standards, for instance, a match between a prescribed number of elements, then the spool B is taken to be of the same format as the spool A, and it is stored as such in the format specific data 106 (step S212 in FIG. 2).

If there is a difference only in respect of the length of an element which is common to both spools when the tables of control points are compared in this way, and if all of the other items are matching, spools are classified as spools having information indicating the difference in length (for example, a dimensional data list) and spools of the same format, and stored in the internal data in accordance with the respective spool format. On the other hand, if there are no matching elements or if the prescribed reference standards are not satisfied, then the spool is stored as data for a new format in the format specific data 106 (step S213 in FIG. 2).

Figure 10:
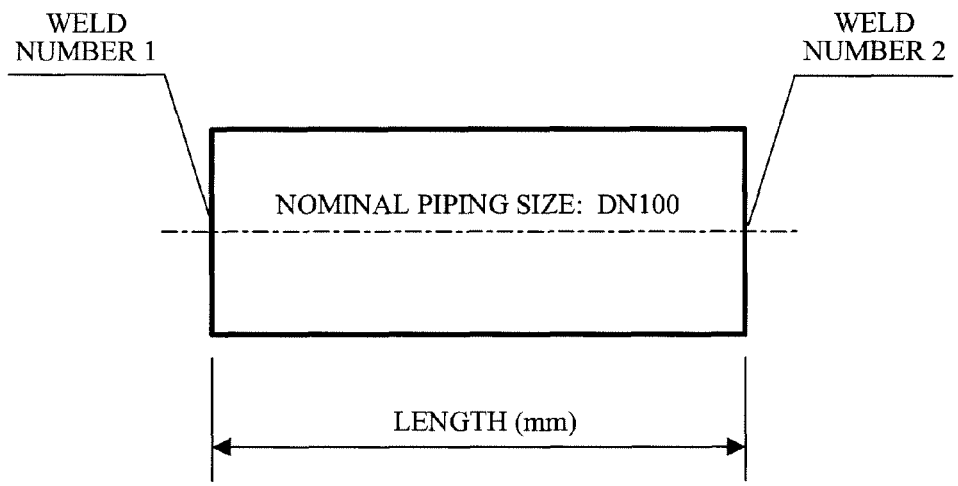
FIG. 10 is a diagram showing an example of the output of a diagram and a list according to an embodiment of the present invention.
Figure 11:
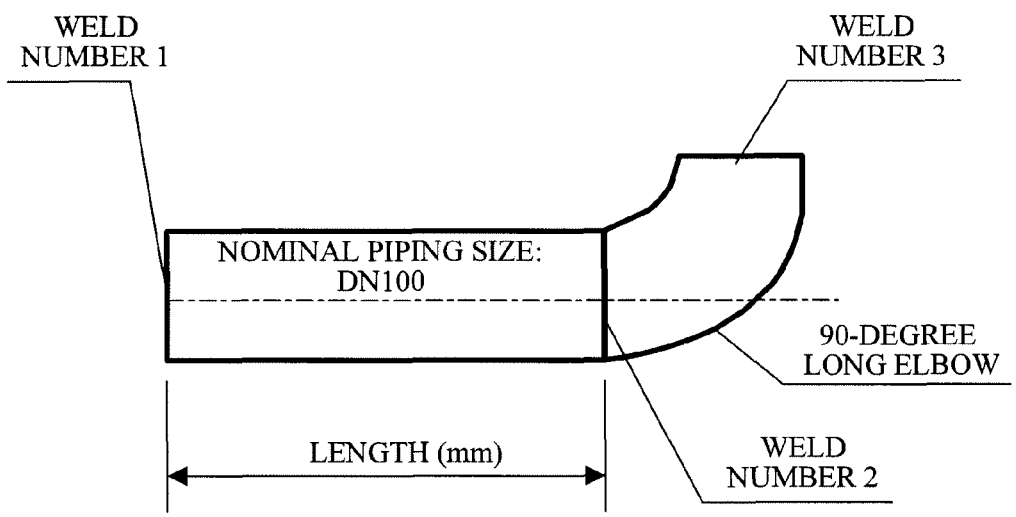
FIG. 11 is a diagram showing an example of the output of a diagram and a list according to an embodiment of the present invention.

Finally, the format specific data 106 obtained as described above is output in the form of lists and diagrams, such as the parameter diagrams and parameter tables shown in FIG. 10 and FIG. 11, for example, by the pasting and outputting means 178, and the format specific data 106 can be used to reduce the workload, in a real and concrete manner.

4. Effects

As described above, in the present embodiment, spools which are read in as internal data are aggregated, and format diagrams are shared by spools of a common format covering a little dimensional difference. Therefore, the number of diagrams and the workload involved in management, and the like, can be reduced, and hence design and manufacture of higher quality can be achieved readily.

In particular, in the present embodiment, by setting the respective spools to a unified arrangement and orientation on the basis of control points which represent the characteristic features of the format of each spool, and by creating tables of control points and comparing these tables, it is possible to extract spools having a common format, readily and reliably.

Furthermore, in the present embodiment, by storing data for each respective spool number only in respect of those components which are necessary, then it is possible to minimize the storage area and calculational load involved in the subsequent processing, resulting in achieving faster processing.

Moreover, in the present embodiment, by using shop weld points, bending points and junction points as the control points, then it is possible to carry out the processes of unifying the arrangement and orientation, and judging common characteristics, and the like, rapidly and accurately, in a suitable concrete manner.

Furthermore, in the present embodiment, in addition to unifying the positions of the spools on the basis of a point of origin in a prescribed three-dimensional coordinates space, the one section between a start point and a first bending point, and the next section following this, are made to lie respectively over the spatial axes, by performing the required rotational movements, and therefore the spools can be set accurately to a unified arrangement and orientation, through a simple algorithm.

Moreover, in the present embodiment, by taking various different elements and attributes as objects for comparison, it is possible to freely control the extent to which the spools are grouped together as common spools, by setting the applicable reference standards appropriately.

Furthermore, in the present embodiment, by comparing all of the spools against each other, from either end, on the basis of the control point tables, then even if there are spools which have mutually reversed shapes, these can be extracted readily as common spools, accurately and without omission.

Moreover, in the present embodiment, by identifying spools which are different only in terms of a length of one portion as spools of the same format, together with information specifying the difference in dimensions, then the number of diagrams and the management load can be reduced effectively and readily, while clearly indicating said differences.

Furthermore, in the present embodiment, by providing information expressing the common characteristics or differences between spools, in the form of being pasted into a spreadsheet or CAD data, then data handling and processing are facilitated, and even greater effects in improving working efficiency can be obtained, readily.

This application claims priority from Japanese Patent Application 2007-099355, filed Apr. 5, 2007, which is incorporated herein by reference in its entirety.

What is claimed is:

1. A CAD system which is realized through a processing unit of a computer, comprising:
a three-dimensional layout adjustment CAD means for assisting the creation of a three-dimensional model of a pipe which constitutes a design object, and for providing pipe layout data including spool numbers;
a storage means for storing previously prepared pipe specifications data;
a data acquisition means for reading in the layout data and the specifications data, and for associating the layout data and the specifications data through linking keys to set the obtained data as internal data; and
a spool aggregating means for aggregating the respective spools in the internal data into respective common formats to obtain format specific data,
wherein the spool aggregating means comprises:
a spool categorization means for categorizing the internal data into spool number units;
a control point extraction means for extracting control points representing the format of each spool;
a rotating means for rotating the respective spools within a prescribed three-dimensional coordinates space, on the basis of the control points so as to set the respective spools to a common layout and orientation;
a table creating means for creating a table of control points in the internal data; and
a comparison and classification means for comparing the tables of control points between respective spools to create format specific data which is stored separately for each spool format.

2. CAD system according to claim 1, wherein the spool categorization means comprises:
a means for linking together a three-dimensional model relating to the layout data, and the specifications data, in the manner of repetitive processing in respect of all of the components constituting the design object, as well as excluding prescribed components which are not required for processing, by applying a filter; and
a means for dividing the components into components having the same spool number and storing the division results as the internal data respectively for each spool number, in the manner of repetitive processing in respect of all of the components after application of the filter.

3. The CAD system according to claim 1, wherein the control point extraction means is constituted so as to generate control points on the basis of shop weld points, bending points and junction points, for each of the respective spool numbers, in the manner of repetitive processing in respect of the spool numbers of all of the components which constitute the design object.

4. The CAD system according to claim 1, wherein the rotating means is constituted so as to set the spools to a common layout and orientation by applying, successively, to each of the spool numbers:
a means for moving the whole spool in such a manner that a start point based on a prescribed reference lies at a point of origin in a prescribed three-dimensional coordinates space;
a means for rotating the whole spool in such a manner that a portion from the start point to a first bending point is superimposed on the X axis in the space; and
a means for rotating the whole spool in such a manner that a portion from the first bending point to a second bending point is superimposed on the Y axis in the space.

5. The CAD system according to claim 1, wherein the table creating means stores tables of control points in the internal data by acquiring or calculating the components, nominal piping size, length, bending radius, vector and other attributes, between the respective control points, which represent the format of the spool, in the manner of repetitive processing in respect of all of the spool numbers.

6. The CAD system according to claim 1, wherein the comparison and classification means is constituted in such a manner that, in the manner of repetitive processing in respect of all of the spool numbers, the comparison and classification means compares the contents of the tables of control points relating to all of the spools, between each and every pair of spools, with taking all of the start points of each spool as a point of origin, thereby determines whether both spools of each pair are matching based on prescribed common characteristics; and
in cases where the both spools are matching, the comparison and classification means classifies the spools of the matching pair as spools of the same format and stores the classified spools as the format specific data.

7. The CAD system according to claim 6, wherein the comparison and classification means is constituted in such a manner that, as the result of comparing the tables of control points, in cases where there is a difference only in respect of the length of an elemental item which is common to both spools, and the other items are matching, the comparison and classification means classifies the spools as spools of having information indicating the difference in length, and as spools of the same format, and stores the classified spools as the format specific data.

8. The CAD system according to claim 1, comprising a pasting and outputting means for outputting the format specific data as a file in which the format specific data is pasted into a spreadsheet or CAD data.

9. A control method for a CAD system which is executed through a processing unit of a computer, comprising:

three-dimensional layout adjustment CAD processing for assisting the creation of a three-dimensional model of a pipe which constitutes a design object, and for providing pipe layout data including spool numbers;

data acquisition processing for reading in the layout data and pipe specifications data previously prepared in a prescribed storage means, and associating the layout data and the specifications data through linking keys to set the obtained data as internal data; and spool aggregation processing for aggregating the respective spools in the internal data into respective common formats to obtain format specific data, wherein the spool aggregating processing comprises the steps of:

categorizing the internal data into spool number units;

extracting control points representing the format of each spool;

rotating the respective spools within a prescribed three-dimensional coordinates space, on the basis of the control points so as to set the respective spools to a common layout and orientation;

creating a table of control points in the internal data; and comparing the tables of control points between respective spools to create format specific data which is stored separately for each spool format.

10. A control program, stored in a non-transitory storage medium, for a CAD system, which realizes a three-dimensional layout adjustment CAD means, a data acquisition means and a spool aggregating means, by controlling a processing unit of a computer, wherein the three-dimensional layout adjustment CAD means is caused to assist the creation of a three-dimensional model of a pipe which constitutes a design object, and present pipe layout data including spool numbers;

the data acquisition means is caused to read in the layout data and pipe specifications data previously prepared in a prescribed storage means, and associate the layout data and the specifications data through linking keys to set the obtained data as internal data; and the spool aggregating means is caused to:

categorize the internal data into spool number units;

extract control points representing the format of each spool;

rotate the respective spools within a prescribed three-dimensional coordinates space, on the basis of the control points so as to set the respective spools to a common layout and orientation;

create a table of control points in the internal data; and compare the tables of control points between respective spools to create format specific data which is stored separately for each spool format.

\* \* \* \* \*